(12) United States Patent
Sakata et al.

(10) Patent No.: US 8,795,884 B2
(45) Date of Patent: Aug. 5, 2014

(54) NONAQUEOUS SECONDARY BATTERY AND ELECTRONIC DEVICE

(75) Inventors: Hideo Sakata, Osaka (JP); Fusaji Kita, Osaka (JP); Kumiko Ishizuka, Osaka (JP); Akiko Kuwabara, Gunma (JP); Yuan Gao, Gunma (JP)

(73) Assignees: Hitachi Maxell, Ltd., Ibaraki-Shi, Osaka (JP); Kanto Denka Kogyo Co., Ltd., Tokyo (JP)

( * ) Notice: Subject to any disclaimer, the term of this patent is extended or adjusted under 35 U.S.C. 154(b) by 269 days.

(21) Appl. No.: 12/991,332

(22) PCT Filed: Apr. 30, 2009

(86) PCT No.: PCT/JP2009/058497
§ 371 (c)(1),
(2), (4) Date: Nov. 5, 2010

(87) PCT Pub. No.: WO2009/136589
PCT Pub. Date: Nov. 12, 2009

(65) Prior Publication Data
US 2011/0052980 A1    Mar. 3, 2011

(30) Foreign Application Priority Data
May 7, 2008   (JP) .................. 2008-121188

(51) Int. Cl.
*H01M 10/056* (2010.01)
*H01M 4/131* (2010.01)
*H01M 4/50* (2010.01)
*H01M 4/525* (2010.01)

(52) U.S. Cl.
USPC ........... 429/199; 429/325; 429/223; 429/224; 429/231.1; 429/231.95

(58) Field of Classification Search
USPC ............... 429/188, 199, 144, 318, 319, 326, 429/231.95, 231.3, 231.6, 223, 224, 325; 526/247, 255, 274
See application file for complete search history.

(56) References Cited

U.S. PATENT DOCUMENTS 4,302,518 A   11/1981   Goodenough et al.
5,147,738 A    9/1992   Toyoguchi
(Continued)

FOREIGN PATENT DOCUMENTS

JP   55-136131 A   10/1980
JP    3-201368 A    9/1991
(Continued)

OTHER PUBLICATIONS

Machine Translation of: JP 2003/007336 A, Sasaki et al., Jan. 10, 2003.*
(Continued)

*Primary Examiner* — Kenneth Douyette
(74) *Attorney, Agent, or Firm* — Birch, Stewart, Kolasch & Birch, LLP

(57) ABSTRACT

In the nonaqueous secondary battery of the present invention, a positive electrode mixture layer included in a positive electrode contains a lithium-containing complex oxide defined by the general formula $Li_xM^1_yM^2_zM^3_vO_2$ (where, $M^1$ represents at least one transition metal element selected from the group consisting of Co, Ni and Mn, $M^2$ represents at least one metal element selected from the group consisting of Mg, Ti, Zr, Ge, Nb, Al and Sn, $M^3$ represents an element other than Li, $M^1$ and $M^2$, $0.97 \leq x < 1.02$, $0.8 \leq y < 1.02$, $0.002 \leq z \leq 0.05$, and $0 \leq v \leq 0.05$) and has a density of $3.5$ g/cm$^3$ or more. A nonaqueous electrolyte contains a fluorinated nitrile compound including two or more cyano groups or a cyano group and an ester group.

8 Claims, 2 Drawing Sheets

(56) References Cited

U.S. PATENT DOCUMENTS

| | | | |
|---|---|---|---|
| 6,352,798 B1* | 3/2002 | Lee et al. | 429/324 |
| 2004/0013946 A1 | 1/2004 | Abe et al. | |
| 2004/0097675 A1* | 5/2004 | Ameduri et al. | 526/247 |
| 2006/0035144 A1 | 2/2006 | Shimizu et al. | |
| 2006/0194118 A1 | 8/2006 | Yew et al. | |
| 2007/0224516 A1* | 9/2007 | Deguchi et al. | 429/339 |
| 2007/0231705 A1 | 10/2007 | Ohzuku et al. | |
| 2008/0038644 A1* | 2/2008 | Abe et al. | 429/331 |
| 2008/0102369 A1* | 5/2008 | Sakata et al. | 429/188 |

FOREIGN PATENT DOCUMENTS

| | | |
|---|---|---|
| JP | 4-171659 A | 6/1992 |
| JP | 7-176202 A | 7/1995 |
| JP | 7-176322 A | 7/1995 |
| JP | 2000-172420 A | 6/2000 |
| JP | 2001-167763 A | 6/2001 |
| JP | 2001-176511 A | 6/2001 |
| JP | 2002-270238 A | 9/2002 |
| JP | 2003007336 A * | 1/2003 ............ H01M 10/40 |
| JP | 2004-179146 A | 6/2004 |
| JP | 2004-296098 A | 10/2004 |
| JP | 2006-73513 A | 3/2006 |
| JP | 2006-245001 A | 9/2006 |
| JP | 2006-278322 A | 10/2006 |
| JP | 2007-273405 A | 10/2007 |
| WO | WO 2007142121 A1 * | 12/2007 |

OTHER PUBLICATIONS

International Search Report, dated Jul. 14, 2009, issued in PCT/JP2009/058497.

* cited by examiner

NONAQUEOUS SECONDARY BATTERY AND ELECTRONIC DEVICE

TECHNICAL FIELD

The present invention relates to a nonaqueous secondary battery with a high capacity and an excellent storage characteristic and to an electronic device using the nonaqueous secondary battery.

BACKGROUND ART

In recent years, secondary batteries have become one of the essential and important components of personal computers, mobile phones, electric vehicles, power storages, etc., as a power source.

In particular, for use in mobile communications such as portable personal computers and PDAs (Personal Digital Assistants), further reductions in size and weight are demanded of secondary batteries. However, since LCD panel backlights and graphics-drawing control require a large amount of power consumption and the capacities of secondary batteries are inadequate under present conditions, it is difficult to make the system of secondary batteries compact or to reduce the weight of secondary batteries. As personal computers in particular have become multifunctional as a result of being equipped with a DVD (Digital Versatile Disc) drive and the like, an amount of power consumed by the personal computers is likely to grow. Accordingly, it is an urgent necessity to increase the power capacity particularly, the discharge capacity of secondary batteries when the electric cell is at a voltage of 3.3 V or more.

Further, electric vehicles that produce neither exhaust gas nor noise have become a focus of attention as global environmental awareness grows. Recently, parallel hybrid electric vehicles (HEVs) have been wining popularity. An HEV adopts a system that stores regenerative energy generated under breaking so as to use the energy in an efficient manner or uses electric energy accumulated in a battery to start the vehicle in order to increase the energy efficiency. However, since the power capacities of the current batteries are small, it is necessary to increase the number of batteries to secure a needed voltage, which results in a reduction in space inside the vehicle or deterioration of the stability of the car body.

Among secondary batteries, nonaqueous secondary batteries using a nonaqueous electrolyte such as a nonaqueous electrolytic solution have become a focus of attention because they generate a high voltage and are lightweight, so that a high energy density can be expected from them. In particular, a nonaqueous secondary battery disclosed in Patent document 1 that uses a lithium-containing transition metal oxide typified by $LiCoO_2$ as a positive electrode active material and metal lithium as a negative electrode material has an electromotive force of 4 V or more. Therefore, it can be expected that the battery will achieve a high energy density.

However, with regard to the current $LiCoO_2$-based secondary batteries using $LiCoO_2$ as a positive electrode active material and a carbon material such as graphite as a negative electrode active material, their charge end voltage is normally 4.2 V or less, which is only about 60% of the theoretical capacity of $LiCoO_2$ in this charging condition. Although it is possible to increase the power capacity by increasing the charge end voltage to be more than 4.2 V, the crystal structure of $LiCoO_2$ disintegrates as the amount of charge increases, causing a reduction in the charge/discharge cycle life or deterioration of the crystal structure of $LiCoO_2$. This may result in problems such as deterioration of the thermal stability.

To solve these problems, a number of attempts have been made to add dissimilar metal elements to $LiCoO_2$ (Patent documents 2 to 5).

Further, a number of attempts have been made to use batteries in a high voltage range of 4.2 V or more (Patent documents 6 to 8). Furthermore, attempts have been made to add additives, such as a compound including two or more cyano groups, to an electrolytic solution to improve battery characteristics (Patent documents 9 to 11).

PRIOR ART DOCUMENTS

Patent Documents

Patent document 1: JP S55-136131 A
Patent document 2: JP H4-171659 A
Patent document 3: JP H3-201368 A
Patent document 4: JP 117-176202 A
Patent document 5: JP 2001-167763 A
Patent document 6: JP 2004-296098 A
Patent document 7: JP 2001-176511 A
Patent document 8: JP 2002-270238 A
Patent document 9: JP 1107-176322 A
Patent document 10: JP 2006-245001 A
Patent document 11: JP 2006-073513 A

SUMMARY OF INVENTION

Problem to be Solved by the Invention

In the future, in addition to an increase in capacity to a degree higher than previously demanded, the secondary batteries will be demanded to have a high degree of reliability more so than conventional batteries. Normally, it is possible to improve the battery capacity significantly by increasing the proportion of active materials contained in the electrode and increasing the electrode density, particularly, the density of the positive electrode mixture layer. However, with such a way to increase the capacity, the reliability such as the storage characteristic of the battery may deteriorate gradually.

Therefore, in order to meet the demand of increasing the power capacity, a battery with the following characteristics is desired: using a material having a stable crystal structure capable of being charged/discharge in a safe and good reversible manner even at an electromotive force (voltage range) higher than that of $LiCoO_2$ and satisfying reliability such as no battery swelling during storage even when the density of the positive electrode mixture layer is increased.

With the foregoing in mind, it is an object of the present invention to provide a nonaqueous secondary battery with a high capacity and an excellent storage characteristic, a use method of the nonaqueous secondary battery and an electronic device using the nonaqueous secondary battery.

Means for Solving Problem

In order to achieve the above-described object, the nonaqueous secondary battery of the present invention includes a positive electrode including a positive electrode mixture layer, a negative electrode and a nonaqueous electrolyte. The positive electrode mixture layer contains a lithium-containing complex oxide defined by the general formula (1) and has a density of 3.5 g/cm³ or more, and the nonaqueous electrolyte contains a fluorinated nitrile compound including two or more cyano groups in molecules or a cyano group and an ester group in molecules.

$$Li_xM^1_yM^2_zM^3_vO_2 \qquad (1)$$

where, $M^1$ represents at least one transition metal element selected from the group consisting of Co, Ni and Mn, $M^2$ represents at least one metal element selected from the group consisting of Mg, Ti, Zr, Ge, Nb, Al and Sn, $M^3$ represents an element other than Li, $M^1$ and $M^2$, $0.97 \leq x < 1.02$, $0.8 \leq y < 1.02$, $0.002 \leq z \leq 0.05$, and $0 \leq v \leq 0.05$.

In the nonaqueous secondary battery of the present invention, the amount of the positive electrode active material charged in the positive electrode mixture layer included in the positive electrode is increased by setting the density of the positive electrode mixture layer to a specific value or more. Also, by using the lithium-containing transition metal oxide, which is highly stabile even in a charged state at a high voltage and contains a specific metal element, the nonaqueous secondary battery of the present invention can be charged at a high voltage. For these reasons, an increase in the capacity of the battery is achieved.

As described above, since the positive electrode active material used in the nonaqueous secondary battery of the present invention has excellent stability, disintegration of the positive electrode active material is suppressed even when the battery is charged/discharged repeatedly. The nonaqueous secondary battery of the present invention can ensure an excellent charge/discharge characteristic due to the effect resulting from the positive electrode active material.

Further, in the nonaqueous secondary battery of the present invention, the nonaqueous electrolyte contains the fluorinated nitrile compound including two or more cyano groups in molecules or a cyano group and an ester group in molecules. This fluorinated nitrile compound has the function of preventing direct contact between the positive electrode and the nonaqueous electrolyte by acting on the surface of the positive electrode. Thus, it is possible to suppress generation of gas in the battery resulting from a reaction between the positive electrode and the nonaqueous electrolyte by suppressing the reaction. Thus, in the nonaqueous secondary battery of the present invention, synergy between the effect of suppressing a reaction between the positive electrode and the nonaqueous electrolyte resulting from the fluorinated nitrile compound and the effect resulting from using the positive electrode active material with high stability prevents battery swelling, which occurs when storing a battery at a high temperature in a charged state, thereby improving its storage characteristic.

The use method of the nonaqueous secondary battery of the present invention is characterized by charging the nonaqueous secondary battery such that a potential of the positive electrode becomes 4.35 to 4.6 V with reference to a potential of Li when the nonaqueous secondary battery is fully charged.

Furthermore, the electronic device of the present invention is characterized by using the nonaqueous secondary battery of the present invention.

Effects of the Invention

According to the present invention, it is possible to provide a nonaqueous secondary battery with a high capacity and an excellent storage characteristic. On the nonaqueous secondary battery of the present invention, for example, high voltage charging that makes the potential of the positive electrode 4.35 to 4.6 V with reference to a potential of Li (lithium) can be performed. That is, the nonaqueous secondary battery of the present invention can be used in accordance with the use method of the present invention and is applicable to uses where high output is required. And since the electronic device of the present invention uses the nonaqueous secondary battery of the present invention having a high capacity and capable of producing a high output, its performance can be enhanced easily or its size can be reduced easily.

DESCRIPTION OF THE INVENTION

Figure 1A:
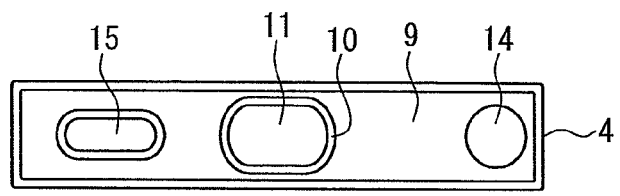
FIG. 1A is a plan view schematically showing one example of the nonaqueous secondary battery of the present invention and FIG. 1B is a partial profile of FIG. 1A.

For example, the nonaqueous secondary battery of the present invention has the following structure. A laminated electrode body formed by stacking a positive electrode including a positive electrode mixture layer and a negative electrode on top of each other via a separator or a wound electrode body formed by winding the laminate electrode body in a spiral form is housed in an outer enclosure together with a nonaqueous electrolyte.

In the nonaqueous secondary battery of the present invention, although a nonaqueous solvent-based electrolytic solution (nonaqueous electrolytic solution) produced by dissolving electrolyte salt, such as lithium salt, in a nonaqueous solvent, such as an organic solvent, can be preferably used for the nonaqueous electrolyte in terms of the battery characteristics and its ease of handling, a polymer electrolyte and a gel electrolyte can also be used without a problem.

The solvent of the nonaqueous electrolytic solution is not particularly limited, and examples thereof include: chain esters such as dimethyl carbonate, diethyl carbonate, methyl ethyl carbonate and methyl propione carbonate; cyclic esters with a high dielectric constant such as ethylene carbonate, propylene carbonate, butylene carbonate and vinylene carbonate; and a mixed solvent of chain ester and cyclic ester. A mixed solvent of chain ester and cyclic ester with the chain ester being the main solvent is particularly suitable.

In addition to the above-described esters, chain triester phosphates such as trimethyl phosphate; ethers such as 1,2-dimethoxyethane, 1,3-dioxolane, tetrahydrofurane, 2-methyl-tetrahydrofurane and diethyl ether; nitriles; dinitriles; isocyanates; and halogen-containing solvents can also be used for the solvent. Furthermore, an amino or imidic organic solvent and a sulfuric organic solvent such as sulfolane can also be used for the solvent.

Examples of the electrolyte salt to be dissolved in the solvent when preparing the non aqueous electrolytic solution include $LiClO_4$, $LiPF_6$, $LiBF_4$, $LiAsF_6$, $LiSbF_6$, $LiCF_3SO_3$, $LiC_4F_9SO_3$, $LiCF_3CO_2$, $Li_2C_2F_4(SO_3)_2$, $LiN(RfSO_2)(Rf'SO_2)$, $LiC(RfSO_2)_3$, $LiC_nF_{2n+1}SO_3(n \geq 2)$ and $LiN(RfOSO_2)_2$ [where Rf and Rf' each represent a fluoroalkyl group]. They may be used individually or in combination of two or more. Among the above-described electrolyte salts, fluorine-containing organic lithium salt with a carbon number of two or more is particularly preferable. This is because the fluorine-containing organic lithium salt has high anionicity and easily separable ions, so that it dissolves easily in the solvent. Although the concentration of the electrolyte salt in the nonaqueous electrolytic solution is not particularly limited, the concentration is preferably in a range of 0.3 mol/L to 1.7 mol/L, and more preferably in a range of 0.4 mol/L to 1.5 mol/L, for example.

As described above, in addition to the nonaqueous electrolytic solution, a gel polymer electrolyte can also be used in the present invention for the nonaqueous electrolyte. Such a gel polymer electrolyte corresponds to a nonaqueous electrolytic solution being gelled using a geling agent. To gel a nonaqueous electrolytic solution, straight-chain polymers, such as polyvinylidene fluoride, polyethylene oxide and polyacrylonitrile or a copolymer thereof, polyfunctional monomers that polymerize by irradiation with an activation light beam such as ultraviolet light or an electron beam (e.g., tetra or more functional acrylates, such as pentaerythritol tetraacrylate, ditrimethylol propane tetraacrylate, ethoxylated pentaerythritol tetraacrylate, dipentaerythritol hydroxyl pentaacrylate and dipentaerythritol hexaacrylate and tetra or more functional methacrylate similar to the acrylates) are used. However, in the case of a monomer, the nonaqueous electrolytic solution is not gelled by a monomer per se but the monomer being polymerized to a polymer acts as a geling agent.

When gelling the nonaqueous electrolytic solution using a multifunctional monomer as described above, benzoyls, benzoinalkyl ethers, benzophenones, benzoyl phenyl phosphine oxides, acetophenones, thioxanthenes, anthraquinones, etc., may be used as a polymerization initiator if needed. Further, alkyl amines, amino ester, etc., may also be used as a sensitizer of the polymerization initiator.

In addition to the nonaqueous electrolytic solution and the gel polymer electrolyte, a solid electrolyte can also be used in the present invention for the non aqueous electrolyte. Both inorganic and organic solid electrolytes can be used.

The nonaqueous electrolyte according to the present invention contains a fluorinated nitrile compound including two or more cyano groups in molecules or a fluorinated nitrile compound including a cyano group and an ester group in molecules. The nonaqueous electrolyte may include one of or both the fluorinated nitrile compound including two or more cyano groups in molecules and the fluorinated nitrile compound including a cyano group and an ester group in molecules.

The fluorinated nitrile compounds each have the function of forming a surface protection film on the surface of the positive electrode active material when the battery is being charged (particularly when the battery is initially charged), so that direct contact between the positive electrode and the nonaqueous electrolyte is prevented by the surface protection film. Thus, even if the battery of the present invention is stored at a high temperature of about 85° C. in a charged state, a reaction between the positive electrode and the nonaqueous electrolyte is prevented because the battery uses the nonaqueous electrolyte containing the fluorinated nitrile compound(s) and direct contact between the positive electrode and the nonaqueous electrolyte is prevented by the surface protection Elm. Therefore, it is possible to prevent generation of gas in the battery resulting from the reaction. The gas generated in the battery as a result of the reaction between the positive electrode and the nonaqueous electrolyte can be a cause of battery swelling, which may widen the distance between the positive and negative electrodes and causes degradation of the battery characteristics. In the battery of the present invention, it is possible to prevent, during storage, the occurrence of battery swelling resulting from the gas, meaning that the battery has an excellent storage characteristic.

Examples of the fluorinated nitrile compound including two or more cyano groups in molecules include a dinitrile compound including fluorine (fluorinated dinitrile compound), a trinitrile compound including fluorine (fluorinated trinitrile compound) and a tetranitrile compound including fluorine (fluorinated tetranitrile compound). Among these nitrile compounds, the fluorinated dinitrile compound (i.e., the compound inducting fluorine and two cyano groups in molecules) is preferable because it exhibits the above-described effect (the effect of preventing a reaction between the positive electrode and the nonaqueous electrolyte by forming the surface protection film on the surface of the positive electrode material) in a more preferable manner. It is more preferable that the fluorinated dinitrile compound is defined by the general formula NC—Rf—CN (where Rf represents strait-chain or branched fluoroalkylene with a carbon number of 1 to 10, a ring fluoroalkylene group or hydrocarbon chain including fluorine and an aromatic ring). Further, the carbon number of Rf in the general formula is preferably 1 to 10.

Specific examples of the fluorinated dinitrile compound include dinitrile compounds in which fluorine substitutes for at least one of hydrogen atoms of alkylene, such as: dinitrile compounds including straight-chain alkylene such as malononitrile (NC—$CH_2$—CN), succinonitrile (NC—$CH_2CH_2$—CN), glutaronitrile (NC—$CH_2CH_2CH_2$—CN, adiponitrile (NC—$CH_2CH_2CH_2CH_2$—CN), 1,5-dicyanopentan (NC—$CH_2CH_2CH_2CH_2CH_2$—CN), 1,6-dicyanohexane NC—$CH_2CH_2CH_2CH_2CH_2CH_2$—CN), and 1,7-dicyanoheptane (NC—$CH_2CH_2CH_2CH_2CH_2CH_2CH_2$—CN); dinitrile compounds including branched alkylene such as 2-methyl-1,3-dicyanopropane [NC—$CH_2CH(CH_3)CH_2$—CN] and 1,4-dicyanopentane [NC—$CH_2CH_2CH_2CH(CN)CH_3$]. More specifically, the examples include 2-fluorohexane dinitrile (NC—$CH_2$—$CH_2$—$CH_2$—CHF—CN), 2,2-difluoro succinonitrile (NC—$CF_2$—$CH_2$—CN), monofluoro malononitrile (NC—CHF—CN, 1-trifluoromethyl succinonitrile [NC—$CH(CF_3)CH_2$—CN] and 2,2,3,3-tetrafluoro adiponitrile (NC—$CH_2CF_2CF_2CH_2$—CN).

For the fluorinated nitrile compound including two or more cyano groups in molecules, those listed above may be used individually or in combination of two or more.

With regard to the fluorinated nitrile compound including a cyano group and an ester group in molecules, examples of the ester group include a carboxylate group (—COO—), a carbonate group (—O—CO—O—), a sulfurous ester group (—$SO_3$—), a sulfuric ester group (—$SO_4$—) and a phosphoric ester group (—$PO_4$). Among these groups, a carboxylate group and a carbonate group are preferable.

Specific examples of the fluorinated nitrile compound including a cyano group and an ester group in molecules include $C_6H_5$—CF(CN)COO$C_2H_5$ (α-cyano-α-fluoro-phenyl-acetic acid ethyl ester), $CH_3$—$C_6H_4$—CF(CN)COO$C_2H_5$ (α-cyano-α-fluoro-p-tolyl-acetic acid ethyl ester), and NC—CHF—P(=O)(O—$C_2H_5)_2$ (diethyl-cyanofluoromethyl-phosphonate). Among these examples, $C_6H_5$—CF(CN)COO$C_2H_5$ and $CH_3$—$C_6H_4$—CF(CN)COO$C_2H_5$ are preferable.

For the fluorinated nitrile compound including a cyano group and an ester group in molecules, those listed above may be used individually or in combination of two or more. The fluorinated nitrile compound including a cyano group and an ester group in molecules preferably has a chain structure. More specifically, the compound preferably includes a hydrocarbon chain in which fluoride substitutes at least a part of hydrogen and the hydrocarbon except the cyano group and ester group has a carbon number of 1 to 10.

The way to prepare the nonaqueous electrolyte containing the fluorinated nitrile compound(s) is not particularly limited. For example, any of the fluorinated nitrile compounds listed above and any of the electrolyte salts listed above may be dissolved in any of the solvents listed above in a usual manner.

In terms of exhibiting the effect resulting from adding the fluorinated nitrile compound including two or more cyano groups in molecules and/or the fluorinated nitrile compound including a cyano group and an ester group in molecules to the nonaqueous electrolyte in a more effective manner, the amount of the compound(s) added to the nonaqueous electrolyte (when the nonaqueous electrolyte includes only one of the compound, the amount is of the included compound and when the nonaqueous electrolyte includes the both compounds, the amount is a total amount of the both compounds, which is true in the following) is preferably 0.005 mass % or more, more preferably 0.01 mass % or more and still more preferably 0.05 mass % or more of the total amount of the nonaqueous electrolyte. However, when a large amount of the fluorinated nitrile compound(s) is added to the nonaqueous electrolyte, the storage characteristic of the battery improves but the charge/discharge cycle characteristic is likely to deteriorate. Therefore, the amount of the fluorinated nitrile compound(s) added to the nonaqueous electrolyte is preferably 1 mass % or less, more preferably 0.75 mass % or less and still more preferably 0.5 mass % or less of the total amount of the nonaqueous electrolyte.

Additives other than the fluorinated nitrile compound(s) further can be added to the nonaqueous electrolytic solution (nonaqueous electrolyte). Examples of such additives include nonionic aromatic compounds. Specific examples of the nonionic aromatic compounds include: compounds in which an alkyl group is bonded to an aromatic ring, such as cyclohexyl benzene, isopropyl benzene, t-butylbenzene, t-amylbenzene, octylbenzene, toluene and xylene; compounds in which a halogen group is bonded to an aromatic ring, such as fluorobenzene, difluorobenzene, trifluorobenzene and chlorobenzene; compounds in which an alkoxy group is bonded to an aromatic ring, such as anisole, fluoroanisole, dimethoxybenzene and diethoxybenzene; aromatic carboxylates such as phthalate esters (dibutyl phthalate, di-2-ethylhexyl phthalate, etc.) and benzoic ester; carbonates including a phenyl group, such as methyl phenyl carbonate, butyl phenyl carbonate, diphenyl carbonate; phenyl propionates; and biphenyls. Among these examples, a compound in which an alkyl group is bonded to an aromatic ring is preferable, and cyclohexyl benzene in particular can be used preferably.

These aromatic compounds can also form a film on the surface of an active material in the positive or negative electrode in the battery. Although these aromatic compounds can be used individually, an excellent effect can be exhibited when they are used in combination of two or more. Particularly, by using a compound in which an alkyl group is bonded to an aromatic ring and an aromatic compound such as biphenyl that is oxidized at a lower potential than the compound in which an alkyl group is bonded to an aromatic ring does, an effect particularly desirable in terms of improving the safety of the battery can be achieved.

The way to include the aromatic compound(s) in the nonaqueous electrolyte is not particularly limited. Generally, the aromatic compound(s) is added to the nonaqueous electrolyte prior to assembling the battery.

A preferred content of the aromatic compound(s) in the nonaqueous electrolyte used in the nonaqueous secondary battery is 4 mass % or more in terms of safety, and 10 mass % or less in terms of the load characteristic. When using two or more of the aromatic compounds in combination, there is no particular limitation as long as the total of the compounds is in the above-described range. When using the compound in which an alkyl group is bonded to an aromatic ring and the compound that is oxidized at a lower potential than the compound in which an alkyl group is bonded to an aromatic ring does in combination, the content of the compound in which an alkyl group is bonded to an aromatic ring in the nonaqueous electrolyte used in the nonaqueous secondary battery is preferably in a range of 0.5 mass % to 8 mass %, and more preferably in a range of 2 mass % to 5 mass %. On the other hand, the content of the compound that is oxidized at a lower potential than the compound in which an alkyl group is bonded to an aromatic ring does in the nonaqueous electrolyte used in the nonaqueous secondary battery is preferably in a range of 0.1 mass % to 1 mass %, and more preferably in a range of 0.2 mass % to 0.5 mass %.

Further, by adding to the nonaqueous electrolyte at least one of the compounds such as an organic halogenic solvent (e.g., halogen-containing carbonate), an organic sulfur compound, fluorine-containing organic lithium salt, a phosphor-containing organic solvent, a silicon-containing organic solvent and a nitride-containing organic compound other than the compound including two or more cyano groups, the surface protection film can be formed on the surface of the positive electrode active material when the battery is initially charged. For example, an organic fluorine-based solvent such as fluorine-containing carbonate, an organic sulfuric solvent and fluorine-containing organic lithium salt are particularly preferable, and specific examples thereof include bis(2,2,3,3,3-pentrifluoropropyl)carbonate [$C_2F_5CH_2O(C=O)OCH_2C_2F_5$], bis(3,3,3-trifluoroethyl)carbonate [$CF_3CH_2O(C=O)OCH_2CF_3$], methyl nonefluoro butyl ether ($C_4F_9OCH_3$), butyl sulfate ($C_4H_9OSO_2OC_4H_3$), methyl ethylene sulfate [(—$OCH(CH_3)CH_2O)SO_2$], butyl sulfone ($C_4H_9SO_2C_4H_9$), polymer imide salt [{—$N(Li)SO_2OCH_2(CF_2)_4$—$CH_2OSO_2$—}$_n$ (where n represent 2 to 100)], ($C_2F_5SO_2)_2NLi$ and {($CF_3)_2CHOSO_2$}$_2NLi$.

These additives can be used individually but it is particularly preferable to use an organic fluorine-based solvent and fluorine-containing organic lithium salt in combination. The amount of the additives added to the nonaqueous electrolyte is preferably 0.1 mass % or more, more preferably 2 mass % or more, and still more preferably 5 mass % or more and preferably 30 mass % or less and more preferably 10 mass % or less of the total amount of the nonaqueous electrolyte used in the nonaqueous secondary battery because of the following reasons. When the amount of the additives is too large, the electric characteristic may deteriorate and when the amount of the additives is too small, it becomes difficult to form the film favorably.

By charging the battery including the nonaqueous electrolyte containing the above-described additives (by charging the battery particularly at a high voltage), the surface protection film containing F (fluorine) or S (sulfur) is formed on the surface of the positive electrode active material. The surface protection film may contain either F or S solely but it is preferable that the film contains both F and S.

A percentage of S atoms in the surface protection film to be formed on the surface of the positive electrode active material is preferably 0.5 atomic % or more, more preferably 1 atomic % or more and still more preferably 3 atomic % or more. However, when the percentage of S atoms in the surface of the positive electrode active material is too large, the discharge characteristic of the battery is likely to deteriorate. Therefore, the percentage of S atoms is preferably 20 atomic % or less, more preferably 10 atomic % or less and still more preferably 6 atomic % or less. Further, a percentage of F atoms in the surface protection film to be formed on the surface of the positive electrode active material is preferably 15 atomic % or more, more preferably 20 atomic % or more and still more preferably 25 atomic % or more. However, when the percentage of F atoms in the surface of the positive electrode active material is too large, the discharge characteristic of the battery is likely to deteriorate. Therefore, the percentage of F atoms is preferably 50 atomic % or less, more preferably 40 atomic % or less and still more preferably 30 atomic % or less.

To improve the charge/discharge cycle characteristic of the battery, it is preferable to add, to the nonaqueous electrolytic solution, at least one of the following: vinylene carbonates, such as (—OCH=CHO—)C=O, (—OCH=C(CH$_3$)O—)C=O and (—OC(CH$_3$)=C(CH$_3$)O—)C=O or derivatives thereof cyclic carbonates including a vinyl group such as vinylethylene carbonate [(—OCH$_2$—CH(—CH=CH$_2$)O—)C=O]; and fluorine-substituted ethylene carbonates, such as (—OCH$_2$—CHFO—)C=O (fluoroethylene carbonate) and (—OCHF—CHFO—)C=O (difluoroethylene carbonate). The amount of the additive(s) added to the nonaqueous electrolyte is preferably 0.1 mass % or more, more preferably 0.5 mass % or more and still more preferably 2 mass % or more of the total amount of the nonaqueous electrolyte used in the nonaqueous secondary battery. When the content of the additive(s) in the nonaqueous electrolyte is too large, the load characteristic of the battery is likely to deteriorate. Therefore, the content of the additive(s) in the nonaqueous electrolyte is preferably 10 mass % or less, more preferably 5 mass % or less, and still more preferably 3 mass % or less of the total amount of the nonaqueous electrolyte used in the nonaqueous secondary battery.

For the positive electrode according to the present invention, it is preferable to use a positive electrode produced by forming a positive electrode mixture layer containing a positive electrode active material and the like on one of or both sides of a current collector.

At least the positive electrode active material contained in the positive electrode mixture layer is partially a lithium-containing transition metal oxide containing at least one metal element selected from the group consisting of Mg, Ti, Zr, Ge, Nb, Al and Sn. Because the lithium-containing transition metal oxide containing at least one of the above-described metal elements has excellent stability (stability particularly at a high voltage in a charged state), disintegration resulting from repeating charge/discharge cycles of the battery is prevented. Therefore, the charge/discharge cycle characteristic of the battery can be improved by using the lithium-containing transition metal oxide. Further, since the lithium-containing transition metal oxide containing at least one of the above-described metal elements has improved stability, the reliability of the battery such as the storage characteristic and safety can also be improved.

Specifically, the positive electrode active material is a lithium-containing complex oxide defined by the general formula (1) described above.

It is preferable that Co and/or Ni is the main ingredient(s) of the transition metal elements of the lithium-containing transition metal element oxide. For example, a total of Co and Ni is preferably 50 mol % or more of the total amount of the transition metal elements contained in the lithium-containing transition metal oxide.

As the percentage of Co in the lithium-containing transition metal oxide is higher, the density of the positive electrode mixture layer can be further increased. Thus, the percentage of Co in the lithium-containing transition metal oxide is preferably higher. For example, the percentage of Co in the transition metal element M$^1$ in the general formula (1) is preferably 30 mol % or more, more preferably 65 mol % or more and still more preferably 95 mol % or more.

In the general formula (1), although x vanes as the battery is charged/discharged, it is 0.97 or more and less than 1.02, preferably in a range of 0.98 to 1.01 and more preferably in a range of 0.99 to 1.00 at the time when the battery is produced.

In the general formula (1), y is 0.8 or more and less than 1.02, preferably 0.98 or more and less than 1.01, and more preferably 0.99 or more and less than 1.0.

It is preferable that the lithium-containing transition metal oxide as the positive electrode active material defined by the general formula (1) contains Mg for M$^2$ because the safety of the battery can be improved more effectively. And together with Mg, the lithium-containing transition metal oxide preferably contains at least one metal element selected from the group consisting of Ti, Zr, Ge, Nb, Al and Sn. In this case, the stability of the lithium-containing transition metal oxide further improves in a charged state at a high voltage. However, when the content of the metal element M$^2$ is too large, an effect of intercalating/deintercalating Li ions may be compromised, so that the battery characteristics may be deteriorated.

In terms of exhibiting the effect resulting from containing Mg in the positive electrode active material in a more effective manner, the content of Mg in the positive electrode active material is preferably 0.1 mol % or more, more preferably 0.15 mol % or more, and still more preferably 0.2 mol % or more based on the content (100 mol %) of M$^1$ (e.g., Co).

Further, when the positive electrode active material contains Ti, Zr, Ge or Nb, in terms of exhibiting the effect resulting from containing these elements in an effective manner, their total amount is preferably 0.05 mol % or more, more preferably 0.08 mol % or more and still more preferably 0.1 mol % or more based on the content (100 mol %) of M$^1$ (e.g., Co). Further, when the positive electrode active material contains Al or Sn, in terms of exhibiting the effect resulting from containing these elements in a more effective manner, their total amount is preferably 0.1 mol % or more, more preferably 0.15 mol % or more and still more preferably 0.2 mol % or more based on the content (100 mol %) of M$^1$ (e.g., Co).

However, when the content of Mg in the positive electrode active material is too large, the load characteristic of the battery is likely to deteriorate. Therefore, the content of Mg is, for example, preferably less than 2 mol %, more preferably less than 1 mol %, still more preferably less than 0.5 mol % and particularly preferably less than 0.3 mol % based on the content (100 mol %) of M$^1$ (e.g., Co).

Further, when the content of at least one metal element selected from the group consisting of Ti, Zr, Ge, Nb, Al and Sn in the positive electrode active material is too large, the effect of increasing the capacity of the battery may decline. Therefore, when the positive electrode active material contains Ti, Zr, Ge or Nb, their total amount is preferably less than 0.5 mol %, more preferably less than 0.25 mol %, and still more preferably less than 0.15 mol % based on the content (100 mol %) of M$^1$ (e.g., Co). Further, when the positive electrode active material contains Al or Sn, their total amount is preferably less than 1 mol %, more preferably less than 0.5 mol %, and still more preferably less than 0.3 mol % based on the content (100 mol %) of M$^1$ (e.g., Co).

The way to contain the metal element M$^2$ in the positive electrode active material according to the present invention is not particularly limited. For example, as long as the metal element M$^2$ is present on the positive electrode active material particles, it may be present in the active material uniformly in a solid solution state, may be unevenly distributed in the active material with a concentration distribution or may be formed on the surface of the active material as a composition layer. However, it is preferable that the metal element M$^2$ is present in the active material uniformly in a solid solution state.

In the general formula (1) defining the positive electrode active material according to the present invention, the element M$^3$ is an element other than Li, M$^1$ and M$^2$. M$^3$ may be contained in the positive electrode active material within the bounds of not compromising the effects of the present invention or it may not be contained.

Examples of the element $M^3$ include alkali metals other than Li (such as Na, K and Rb), alkali-earth metals other than Mg (such as Be, Ca, Sr and Ba), IIIa group metals (such as Sc, Y and La), IVa group metals other than Ti and Zr (such as Hf), Va group metals other than Nb (such as V and Ta), Via group metals (such as Cr, Mo and W), VIla group metals other than Mn (such as Tc and Re), Via group metals other than Co and Ni (such as Fe, Ru and Rh), Ib group metals (such as Cu, Ag and Au), IIIb group metals other than Zn and Al (such as B, Ga and In), IVb group metals (Si) other than Sn, Pb and Ge, and Vb group metals (P and Bi).

The positive electrode active material (lithium-containing transition metal oxide) is formed through a particular combining process and a particular battery production process. For example, to obtain the lithium-containing transition metal oxide containing Co for the transition metal element $M^1$, generally, an alkali such as NaOH is dropped in a Co acidic aqueous solution to precipitate $Co(OH)_2$. Then, to achieve uniform precipitation, a dissimilar element is precipitated to obtain a coprecipitate composition, and the coprecipitate composition is baked to produce $Co_3O_4$. It is possible to control the particle size of the precipitate by controlling the time over which the precipitate is produced and the particle size of the precipitate at this time becomes a dominant factor that will determine the particle size of $Co_3O_4$ after the baking. When two or more kinds of the positive electrode active materials that are different from each other in average particle size are used in combination, the positive electrode active material particles can be charged easily in the positive electrode mixture layer. Thus, it becomes easier to further increase the density of the positive electrode mixture layer as well as the capacity of the battery.

When combining the positive electrode active materials, it is necessary to select a particular mixing condition, a baking temperature, a baking atmosphere, baking time, starting materials and particular battery production conditions. With regard to the mixing condition when combining the positive electrode active materials, it is preferable to add ethanol or water to a raw material powder and mix them in a planetary ball mill for 0.5 hours or more. It is more preferable to add ethanol and water to the raw material powder at a volume ratio of 50:50 and mix them in the planetary ball mill for 20 hours or more. As a result of this mixing process, the raw material powder is pulverized and mixed to a sufficient degree, so that a uniform dispersion solution can be prepared. The dispersion solution is dried using a spray dryer or the like while maintaining the uniformity of the solution. The baking temperature is preferably in a range of 750 to 1050° C. and more preferably in a range of 950 to 1030° C. Further, the baking atmosphere is preferably in air. The baking time is preferably in a range of 10 to 60 hours and more preferably in a range of 20 to 40 hours.

With regard to the positive electrode active material, $Li_2CO_3$ is preferable as the source of Li. As the source of each of dissimilar metals such as Mg, Ti, Ge, Zr, Nb, Al and Sn, nitrite, hydroxide or oxide of each metal having a particle size of 1 μm is preferable. A coprecipitate of hydroxides is more preferable because dissimilar elements become more likely to be distributed in the active material uniformly.

The amount of each metal element in the positive electrode active material in the positive electrode mixture layer can be determined by measuring the amount of each element using an inductively coupled plasma (ICP) analysis. The amount of Li can be measured using a separate method, for example, using atomic absorption.

In this specification, the ICP analysis used to measure the amount of each metal element in the positive electrode active material is conducted as follows. About 5 g of the active material is scaled and placed in a 200-ml beaker. Then, 100 ml of aqua regia is added to the active material and they are condensed by heating until the volume of the solution becomes about 20 to 25 ml. After cooling the solution, solids are separated from the solution using quantifying filter paper "No. 5B" (manufactured by Advantec Toyo Kaisha, Ltd.). The filtrate and washing are placed in a 100-ml volumetric flask to diluted the filtrate to a certain volume, and subsequently the amount of each metal element in the diluted filtrate is measured using a sequential ICP analyzer "IDIS1000" (manufactured by Nippon Jarrell-Ash Inc.).

For example, the positive electrode is produced as follows. First, a conductive assistant (e.g., graphite, carbon black, acetylene black) is added to the lithium-containing transition metal oxide as the positive electrode material if needed. A binder (e.g., polyvinylidene fluoride, polytetrafluoroethylene) is further added to the lithium-containing transition metal oxide to prepare a positive electrode mixture. The positive electrode mixture is made into a paste using a solvent (the binder may be dissolved in the solvent before adding it to the positive electrode active material) to prepare a positive electrode mixture containing paste. The obtained positive electrode mixture containing paste is applied to a positive electrode current collector made of an aluminum foil, and the applied positive electrode mixture containing paste is dried to form a positive electrode mixture layer. And then, through a rolling process if needed, a positive electrode is obtained. When using two or more types of the lithium-containing transition metal oxides that are different from each other in average particle size as the positive electrode active materials, these lithium-containing transition metal oxides are mixed with each other at a certain mass ratio, and a positive electrode mixture prepared by adding the conductive assistant and the binder to this mixture is then subjected to the subsequent processes. However, the method of producing the positive electrode is not limited to the method described above and other method may also be used.

The density of the positive electrode mixture layer according to the present invention is 3.5 $g/cm^3$ or more, preferably 3.6 $g/cm^3$ or more and more preferably 3.8 $g/cm^3$ or more. In the battery of the present invention, the amount of the positive electrode active material charged in the positive electrode mixture layer is increased to make the positive electrode mixture layer included in the positive electrode have a high density as described above in order to increase the capacity of the battery. However, when the density of the positive electrode mixture layer is too high, the wetness of the nonaqueous electrolyte declines. Therefore, the positive electrode mixture layer preferably has a density of 4.6 $g/cm^3$ or less, more preferably 4.4 $g/cm^3$ or less, and still more preferably 4.2 $g/cm^3$ or less.

The density of the positive electrode mixture layer described in this specification is a value determined by the following measuring method. First, the positive electrode is cut in a certain area size, and the mass of the positive electrode is measured using an electronic balance with a minimum scale of 1 mg. Then, the mass of the positive electrode mixture layer is calculated by subtracting the mass of the current collector from the measured weight. Further, the total thickness of the positive electrode is measured at 10 points using a micrometer with a minimum scale of 1 μm. An average of values determined by subtracting the thickness of the current collector from the measured thickness and the area are used to calculate the volume of the positive electrode mixture layer and the calculated volume is divided by the mass of the positive electrode mixture layer to calculate the density of the positive electrode mixture layer.

For example, the thickness of the positive electrode mixture layer is preferably in a range of 30 to 200 μm. Further, the thickness of the current collector used in the positive electrode is preferably in a range of 8 to 20 μm, for example.

The content of the lithium-containing transition metal oxide(s) as the active materials) in the positive electrode mixture layer is preferably 96 mass % or more, more preferably 97 mass % or more and still more preferably 97.5 mass %. The content is preferably 99 mass % or less and more preferably 98 mass % or less. Further, the content of the binder in the positive electrode mixture layer is preferably in a range of 1 mass % to 4 mass %, more preferably in a range of 1.3 mass % to 3 mass %, and still more preferably in a range of 1.5 mass % to 2 mass %, for example. And the content of the conductive assistant in the positive electrode mixture layer is preferably in a range of 1 mass % to 3 mass %, more preferably in a range of 1.1 mass % to 2 mass %, and still more preferably in a range of 1.2 mass % to 1.5 mass %, for example.

When the proportion of the active material(s) in the positive electrode mixture layer is small, it is difficult to increase the capacity of the battery as well as the density of the positive electrode mixture layer. On the other hand, when the proportion of the active material(s) is too large, it may result in an increase in resistance and loss of the formability of the positive electrode. Further, when the content of the binder in the positive electrode mixture layer is too large, it is difficult to increase the capacity of the battery; and when the content is too small, the adherence of the positive electrode mixture layer to the current collector deteriorates and the powder may fall off from the electrode. Thus, the above-described preferred composition is desirable. Furthermore, when the content of the conductive assistant in the positive electrode mixture layer is too large, it is difficult to increase the density of the positive electrode mixture layer to a sufficient degree, which results in a difficulty in increasing the capacity of the battery. On the other hand, when the content is too small, the conductivity may not be attained successfully, which may lead to deterioration of the charge/discharge characteristic and load characteristic of the battery.

As long as the nonaqueous secondary battery of the present invention includes the nonaqueous electrolyte and the positive electrode described above, other battery components and its structure are not particularly limited. A variety of components and structures adopted in conventionally known nonaqueous secondary batteries can be applied to the nonaqueous secondary battery of the present invention.

A negative electrode active material used in the negative electrode is not particularly limited as long as it can dope/remove Li ions, and examples of which include carbon materials such as graphite, pyrolytic carbons, coke, glassy carbons, a calcined organic polymer compound, mesocarbon microbeads, a carbon fiber and activated carbons. Further, alloys of Si, Sn, In and the like, oxides of Si, Sn and the like that can be charged/discharged at a low potential dose to Li and compounds such as a nitride of Li and Co, e.g., $Li_{2.6}Co_{0.4}N$, can be used as the negative electrode active material. Further, it is also possible to replace a part of graphite with a metal that can form an alloy with Li or with an oxide. It is preferable to use graphite for the negative electrode active material because it is possible to assume that the voltage at the time when the battery is fully charged is about 0.1 V based on Li, so that, for convenience in calculation, the potential of the positive electrode can be expressed by adding 0.1 V to the battery voltage and the charge potential of the positive electrode can be controlled easily.

As the form of graphite, it is preferable that a lattice spacing ($d_{002}$) between 002 planes is 0.338 inn or less. This is because the higher the crystallinity, the easier it becomes to increase the density of the negative electrode (the negative electrode mixture layer described later). However, when dim is too large, the discharge characteristic and load characteristic deteriorate with the high density negative electrode. Therefore, $d_{002}$ is preferably 0.335 nm or more, and more preferably 0.3355 nm or more.

Further, the crystallite size of graphite in the c axis direction (Lc) is preferably 70 nm or more, more preferably 80 nm or more, and still more preferably 90 nm or more. This is because larger Lc results in a flat charging curve, so that the potential of the positive electrode can be controlled easily and the capacity of the battery can be increased. On the other hand, when Lc is too large, the capacity of the battery is likely to decline with the high-density negative electrode. Therefore, Lc is preferably less than 200 nm.

Furthermore, the specific surface of graphite is preferably 0.5 $m^2/g$ or more, more preferably 1 $m^2/g$ or more, and still more preferably 2 $m^2/g$ or more. Further, the specific surface is preferably 6 $m^2/g$ or less, and more preferably 5 $m^2/g$ or less. This is because when the specific area of graphite is not large enough, the characteristics are likely to deteriorate. On the other hand, when the specific area is too large, an impact resulting from a reaction with the nonaqueous electrolyte is likely to become manifest.

In the negative electrode, it is preferable to use graphite derived from natural graphite. It is more preferable to use a mixture of two or more types of graphite that are different from each other in surface crystallinity in terms of increasing the capacity. Since natural graphite is low priced and has a high capacity, it is possible to produce the negative electrode with a high degree of cost effectiveness. Normally, the use of natural graphite increases the density of the negative electrode but likely to result in a decline in the battery capacity. However, by using graphite subjected to a surface treatment to degrade its surface crystallinity in combination, it is possible to prevent a decline of the battery capacity.

The surface crystallinity of graphite can be determined using a Raman spectrum analysis. When an R value [$R=I_{1350}/I_{1580}$ (ratio between Raman intensity in the vicinity of 1350 $cm^{-1}$ and that in the vicinity of 1580 $cm^{-1}$)] of a Raman spectrum when graphite is excited by an argon laser having a wavelength of 514.5 nm is 0.01 or more, it can be said that the surface crystallinity is some what degraded as compared with natural graphite. Therefore, it is desirable to use graphite whose surface crystallinity is degraded due to a surface treatment and having a R value of, for example, preferably 0.01 or more, more preferably 0.1 or more and preferably 0.5 or less, more preferably 0.3 or less and still more preferably 0.15 or less. The content proportion of graphite whose surface crystallinity is degraded is preferably 100 mass % in terms of increasing the density of the negative electrode. However, in terms of preventing a decline of the battery capacity, the content of graphite whose surface crystallinity is degraded is preferably 50 mass % or more, more preferably 70 mass % or more and particularly preferably 85 mass % or more of the total amount of graphite.

Further, the average particle size of graphite is preferably 5 μm or more, more preferably 12 μm or more, and still more preferably 18 μm or more because the irreversible capacity increases when the average particle size is too small. Further, in terms of increasing the density of the negative electrode, the average particle size of graphite is preferably 30 μm or less, more preferably 25 μm or less, and still more preferably 20 μm or less.

The average particle size is a value measured using a laser diffraction scattering method. That is, the value can be derived from a particle size distribution that utilizes a scattering intensity distribution detected by projecting laser light to an object to be measured dispersed in a gas phase or a liquid phase such as water, and be based on an accumulated volume percentage. In the present invention, the "average particle size" refers to a value of the diameter with an accumulated volume percentage of 50%, i.e., $d_{50}$.

For example, the negative electrode can be produced as follows. A binder and the like are added to the negative electrode active material if needed, and they are mixed to prepare a negative electrode mixture. Subsequently, the mixture is dispersed in a solvent to prepare a paste. It is preferable to dissolve the binder in the solvent before mixing it with the negative electrode active material. The negative electrode mixture containing paste is applied onto a negative electrode current collector made of a copper foil or the like. Thereafter, the applied negative electrode mixture containing paste is dried to form a negative electrode mixture layer. Then, after undergoing a pressure treatment process, the negative electrode is obtained. Note that the method of producing the negative electrode is not limited to the method described above and other method may be adopted.

Note that the density of the negative electrode mixture layer (the density after the pressure treatment process) is preferably 1.70 $g/cm^3$ or more, and more preferably 1.75 $g/cm^3$ or more. On the basis of the theoretical density of graphite, the upper limit of the density of the negative electrode mixture layer is 2.1 to 2.2 $g/cm^3$. However, in terms of the affinity with the nonaqueous electrolyte, the density of the negative electrode mixture layer is more preferably 2.0 $g/cm^3$ or less, and still more preferably 1.9 $g/cm^3$ or less. With regard to the pressure treatment process, it is preferable to subject the negative electrode to the pressure treatment not once but a plurality of times because the negative electrode can be pressed more uniformly.

Although the binder to be used in the negative electrode is not particularly limited, it is preferable that the amount of the binder to be used is as small as possible in terms of increasing the proportion of the active material to increase the capacity. For this reason, a mixture of a water-borne resin having a water-soluble or water-dispersible characteristic and a rubber-based resin is preferable. A water-borne resin contributes to the dispersion of graphite even when it is used in a small amount and a rubber-based resin can prevent the negative electrode mixture layer from being peeled off from the current collector resulting from the electrode being shrunk/swollen with charge/discharge cycles of the battery.

Examples of the water-borne resin include: cellulose resins, such as carboxymethyl cellulose and hydroxypropyl cellulose; and polyether resins, such as polyvinyl pyrrolidone, polyepichlorohydrin, polyvinyl pyridine, polyvinyl alcohol, polyethylene oxide and polyethylene glycol. Examples of rubber-based resin include latex, butyl rubber, fluorine rubber, styrene-butadiene rubber, nitrile-butadiene copolymer rubber, an ethylene-propylene-diene copolymer, polybutadiene and an ethylene-propylene-diene copolymer (EPDM). For example, in terms of the dispersion of graphite and the peeling prevention, it is preferable to use a cellulose-ether compound, such as carboxymethyl cellulose, and butadiene copolymer-based rubber, such as styrene-butadiene rubber, in combination. In particular, it is preferable to use carboxymethyl cellulose and butadiene copolymer-based rubber, such as styrene-butadiene rubber or nitrile-butadiene copolymer rubber, in combination. This is because a cellulose-ether compound such as carboxymethyl cellulose mainly exerts a thickening effect on the negative electrode mixture containing paste and a rubber-based binder such as styrene-butadiene copolymer rubber exerts a bonding effect on the negative electrode mixture. When using a cellulose-ether compound such as carboxymethyl cellulose and a rubber-based binder such as styrene-butadiene rubber as described above, their ratio is preferably in a range of 1:1 to 1:15 (mass ratio).

For example, the thickness of the negative electrode mixture layer is preferably in a range of 40 to 200 μm. Further, the thickness of the current collector used in the negative electrode is preferably in a range of 5 to 30 μm, for example.

And the content of the binder(s) (a total when using a plurality of binders) in the negative electrode mixture layer is preferably 1.5 mass % or more, more preferably 1.8 mass % or more, and still more preferably 2.0 mass % or more. Further, the content of the binder(s) is preferably less than 5 mass %, more preferably less than 3 mass %, and still more preferably less than 2.5 mass %. This is because when the amount of the binder(s) in the negative electrode mixture layer is too large, the discharge capacity may drop. On the other hand, when the amount of the binder(s) is too small, the adhesion of particles to each other drops. The content of the negative electrode active material in the negative electrode mixture layer is preferably more than 95 mass % and 98.5 mass % or less.

The thickness of the separator according to the present invention is preferably 5 μm or more, more preferably 10 μm or more, and still more preferably 12 μm or more and preferably less than 25 μm, more preferably less than 20 μm, and still more preferably less than 18 μm in terms of allowing the separator to have a directional tensile strength and reduced thermal shrinkage and to maintain excellent insulation. Further, the air permeability of the separator is preferably 500 sec./100 ml or less, more preferably 300 sec./100 ml or less, and still more preferably 120 sec./100 ml or less. As the air permeability of the separator is smaller, the load characteristic improves further. However, an internal short circuit is more likely to occur. Therefore, it is preferable that the air permeability of the separator is 50 sec./100 ml or more.

As the thermal shrinkage ratio of the separator in the TD direction is smaller, the occurrence of internal short circuit at the time of an increase in temperature becomes less likelier. Therefore, it is preferable that the thermal shrinkage ratio in the TD direction of the separator to be used is as small as possible. For example, the thermal shrinkage ratio in the TD direction is preferably 10% or less and more preferably 5% or less. Further, in order to suppress thermal shrinkage, it is preferable that the separator to be used is subjected to a heat treatment at a temperature of about 100 to 125° C. in advance. It is recommended to use the separator having such a thermal shrinkage ratio in combination with the positive electrode material according to the present invention in forming the battery because the behavior of the battery at high temperatures stabilizes.

The thermal shrinkage ratio of the separator in the TD direction refers to a shrinkage ratio of a portion of a 30×30 mm separator that shrunk the largest in the 11) direction as a result of letting the separator stand still for eight hours at 105° C.

With regard to the strength of the separator, the tensile strength of the separator in the MD direction is preferably $6.8 \times 10^7$ $N/m^2$ or more, and more preferably $9.8 \times 10^7$ $N/m^2$ or more, for example. Further, the tensile strength in the TD direction is preferably smaller than the tensile strength in the MD direction, and the ratio of the tensile strength in the TD direction to the tensile strength in the MD direction (tensile strength in the TD direction/tensile strength in the MD direction) is more preferably 0.95 or less, still more preferably 0.9 or less, and more preferably 0.1 or more. As disclosed in JP 2000-172420 A, for example, the MD direction refers to a direction in which a film resin is pulled when producing the separator, and the TD direction is a direction that is perpendicular to the MD direction.

Further, the penetrating strength of the separator is preferably 2.0 N or more and more preferably 2.5 N or more. As the value is larger, a short circuit occurs less in the battery. Normally, however, the upper limit of the value is substantially determined by the material of the separator. For example, the upper limit value of a polyethylene separator is about 10 N.

When a conventional nonaqueous secondary battery is charged at a high voltage, for example, when the potential of the positive electrode is 4.35 V or more based on Li and discharged at an end voltage higher than 3.2 V, the following problems occur. The crystal structure of the positive electrode active material is disintegrated, causing a decline in capacity, and the thermal stability is deteriorated, resulting in generation of heat by the battery. Therefore, the conventional nonaqueous secondary battery lacks practicality. For example, even if a positive electrode active material to which dissimilar elements such as Mg and Ti are added is used, the positive electrode active material improves the safety and prevents a decline in the capacity with charge/discharge cycles but it is still insufficient. Further, since the chargeability of the positive electrode is insufficient, battery swelling is likely to occur.

In contrast, because the nonaqueous secondary battery of the present invention adopts the above-described configuration, it has characteristics such as having a high capacity, improved charge/discharge cycle characteristic and improved safety and swelling prevention (storage characteristic). Although these effects can be achieved at a normal charge voltage (4.2 V at the battery voltage), even when the positive electrode is charged further to a high voltage of 4.35 V (4.25 V at the battery voltage) or more based on Li and is discharged at a high voltage of 3.2 V or more at the battery voltage, the crystal structure of the positive electrode active material is more stable, so that it is possible to suppress a decline in capacity as well as deterioration of the thermal stability.

Further, since the positive electrode active material used in a conventional nonaqueous secondary battery has a low average voltage, a large amount of Li ions is released from/enter the positive electrode when a charge/discharge cycle test is performed repeatedly under such a condition that the charge end voltage of the electric cell is 4.35 V or more based on Li. This is the same as performing a charge/discharge cycle test on the battery under an overcharged condition. Thus, when the conventional positive electrode active material is used under such an extreme condition, the positive electrode active material cannot maintain its crystal structure, thereby causing problems such as deterioration of the thermal stability and a decline in the charge/discharge cycle life. In contrast, such problems can be solved by using the positive electrode active material used in the battery of the present invention. Therefore, it is possible to provide a nonaqueous secondary battery that can be charged/discharged irreversibly even at a high voltage where the potential of the positive electrode becomes 4.35 to 4.6 V with reference to a potential of Li at the time when the battery is fully charged.

The phrase "fully charged" described above refers to charging performed under the following conditions. First, constant current charging is performed on the battery at current value of 0.2 C until the battery voltage reaches a certain voltage, and then constant voltage charging is performed on the battery at the certain voltage. A total of time over which the constant current charging and the constant voltage charging are performed is eight hours. Further, when the nonaqueous secondary battery of the present invention includes a graphite negative electrode (negative electrode that contains graphite as a negative electrode active material) whose potential becomes 0.1 V with reference to a potential of Li at the time when the battery is fully charged, charging performed at a battery voltage at 4.45 V or more is substantially considered as charging that makes the potential of the positive electrode 4.35 V or more.

By making full use of the characteristics of the nonaqueous secondary battery of the present invention such as capable of generating a high voltage and having a high capacity and an excellent storage characteristic, the nonaqueous secondary battery can be used as a power source of a variety of electronic devices such as the following: a notebook computer, a stylus-operated personal computer, a pocket personal computer, a notebook word processor, a pocket word processor, an electronic book player, a mobile phone, a cordless handset, a pager, a handy terminal, a portable copier, an electronic handheld organizer, a calculator, an LCD TV, an electronic shaver, an electronic power tool, an electronic translating machine, a car phone, a transceiver, a voice input device, a memory card, a backup power source, a tape recorder, a radio, a headphone stereo, a portable printer, a handy cleaner, a portable CD player, a video camcorder, a navigation system; a refrigerator, an air conditioner, a television, a stereo, a water heater, a microwave oven, a dishwasher, a washing machine, a drier, a game console, illumination equipment, a toy, a sensor, a load conditioner, medical equipment, a vehicle, an electronic vehicle, a golf cart, an electrically-powered cart, a security system, and a power storage system. In addition to consumer applications, the nonaqueous secondary battery of the present invention can also be used for aerospace applications. When the nonaqueous secondary battery of the present invention is used particularly in a small portable device, the effect resulting from its high capacity can be exhibited to a high degree. Thus, the nonaqueous secondary battery of the present invention is used desirably in a portable device having a mass of 3 kg or less, and more desirably in a portable device having a mass of 1 kg or less. Although the lower limit of the mass of a portable device is not limited, it is desirable that the portable device has the same mass as that of the battery, for example, 10 g or more so as to attain the effects to a certain degree.

The battery of the present invention can exhibit its effects to a high degree when it is applied particularly to a portable device with a thin battery storage space cover. This is because when battery swelling occurs in a portable device with a thin battery storage space cover, the battery storage space cannot be closed with the cover. The thickness of the cover of the portable device to which the battery of the present invention is applied is preferably 1.5 mm or less, more preferably 1.2 mm or less, and still more preferably 0.8 mm or less. This is because the cover is more likely to deform as its thickness is smaller. Further, it is preferable that a clearance between the battery storage space cover and the battery (when the cover and the battery are formed in one piece, a clearance between the storage space and the battery) is smaller because wasted space in the portable device can be reduced. Normally, the clearance between the cover and the battery is 1 mm or less, desirably 0.5 mm or less, and particularly desirably 0.3 mm or less. The battery may be completely sealed with the cover or they may be in dose contact with each other without clearance. On the other hand, when the clearance between the cover and the battery is small, the cover may be damaged or the space cannot be closed with the cover when battery swelling occurs. However, the use of the battery of the present invention can prevent the occurrence of such problems.

EXAMPLES

Herein after, the present invention will be described in detail by way of Examples. Note that the present invention is not limited to the following Examples.

Example 1

Production of Positive Electrode 97.3 parts by mass of $LiCu_{0.998}Mg_{0.0008}Ti_{0.0004}Al_{0.0008}O_2$ (average particle size: 12 μm) and 1.5 parts by mass of a carbon material as a conductive assistant were put in a metering feeder as a powder feeder. Also, an N-methyl-2-pyrolidone (NMP) solution with a polyvinylidene fluoride (PVDF) concentration of 10 mass % was put in the metering feeder. A material obtained by adjusting the input of the NMP solution so as to adjust the solid concentration at kneading to be always 94 mass % was put in a biaxial kneader/extruder and kneaded while the input of the material was controlled to be a certain amount per unit time, thus preparing a positive electrode mixture containing paste.

Separately, the positive electrode active material was dissolved in aqua regia to check the ratio of contained elements using an ICP analysis and an atomic absorption analysis. It was found that positive electrode active material met the composition formula.

Next, the obtained positive electrode mixture containing paste was put in a planetary mixer. The NMP solution with a PVDF concentration of 10 mass % and NMP were put in the planetary mixer to dilute the positive electrode mixture containing paste to adjust the viscosity of the paste to an applicable level. After allowing the diluted positive electrode mixture containing paste to pass through a 70-mesh screen to remove large ingredients, the paste was uniformly applied to both sides of a current collector made of an aluminum foil having a thickness of 15 μm. Then, the applied paste was dried to form filmy positive electrode mixture containing layers. The ratio of solids (positive electrode active material:conductive assistant PVDF) in each dried positive electrode mixture layer was 97.3:1.5:1.2 (mass ratio). Thereafter, the current collector was subjected to a pressure treatment and cut into a certain size, followed by welding of an aluminum lead to the cut current collector, thus producing a sheet-like positive electrode. The density of each positive electrode mixture layer after the pressure treatment (the density of the positive electrode) was 3.86 g/cm$^3$ and the thickness of the positive electrode mixture layers (the thickness of both sides, i.e., the thickness determined by subtracting the thickness of the aluminum foil as the positive electrode current collector from the total thickness of the positive electrode, which is true in the following) was 135 μm.

In the positive electrode active material, Mg was 0.08 mol %, Ti was 0.04 mol % and Al was 0.08 mol % based on 100 mol % of Co. Further, the concentration of the metal element M$^2$ in the particle cross-section was measured using an electron probe microanalyzer "EPMA 1600" (manufactured by Shimazu Corporation). With regard to Mg, Ti and Al, no difference between the concentration on the surface and the concentration at the center was found.

<Production of Negative Electrode>

As negative electrode active materials, 70 parts by mass of a graphite-based carbon material (A) [purity: 99.9% or more, average particle size: 18 μm, lattice spacing ($d_{002}$) between 002 planes: 0.3356 nm, crystallite size in the c axis direction (Lc): 100 nm, R value (ratio between peak intensity in the vicinity of 1350 cm$^{-1}$ and that in the vicinity of 1580 cm$^{-1}$ in a Raman spectrum when the material was excited by an argon laser having a wavelength of 514.5 nm $\{R=I_{1350}/I_{1580}\}$): 0.18] and 30 parts by mass of a graphite-based carbon material (B) [purity: 99.9% or more, average particle size: 21 μm, $d_{002}$: 0.3363 nm, Lc: 60 nm, R value: 0.11] were mixed with each other. 98 parts by mass of this mixture, 1 part by mass of carboxymethyl cellulose and 1 part by mass of styrene-butadiene rubber were mixed with each other in the presence of water to prepare a slurry negative electrode mixture containing paste. The obtained negative electrode mixture containing paste was applied to both sides of a negative electrode current collector made of a copper foil and having a thickness of 10 μm. The applied paste was dried to form negative electrode mixture layers. Then, the current collector was subjected to a pressure treatment using a roller until the density of each negative electrode mixture layer became 1.75 g/cm$^3$, and cut into a certain size, followed by welding of an aluminum lead to the cut current collector, thus producing a sheet-like negative electrode.

<Preparation of Nonaqueous Electrolytic Solution>

In a mixed solvent obtained by mixing methyl ethyl carbonate, diethyl carbonate and ethylene carbonate at a volume ratio of 1:3:2, LiPF$_6$ was dissolved such that its concentration became 1.4 mol/L. Then, 0.2 mass % of 2-fluorohexanedinitrile [NC—(CH$_2$)$_3$—CHF—CN] and 3 mass % of vinylene carbonate (VC) were added to the solvent to prepare a nonaqueous electrolytic solution.

<Production of Nonaqueous Secondary Battery>

Figure 1B:
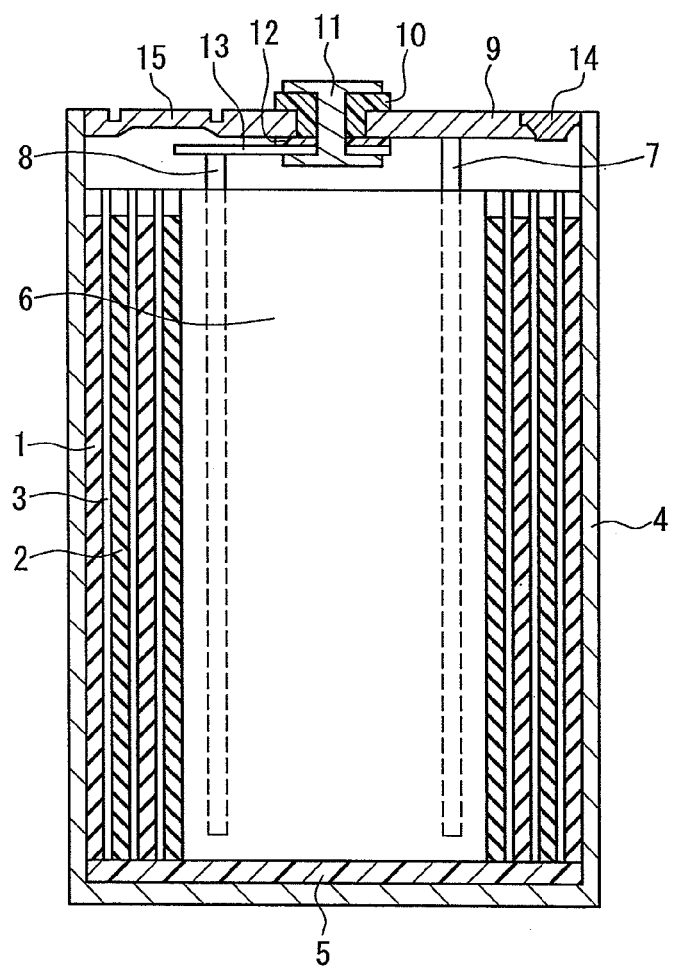
Figure 2:
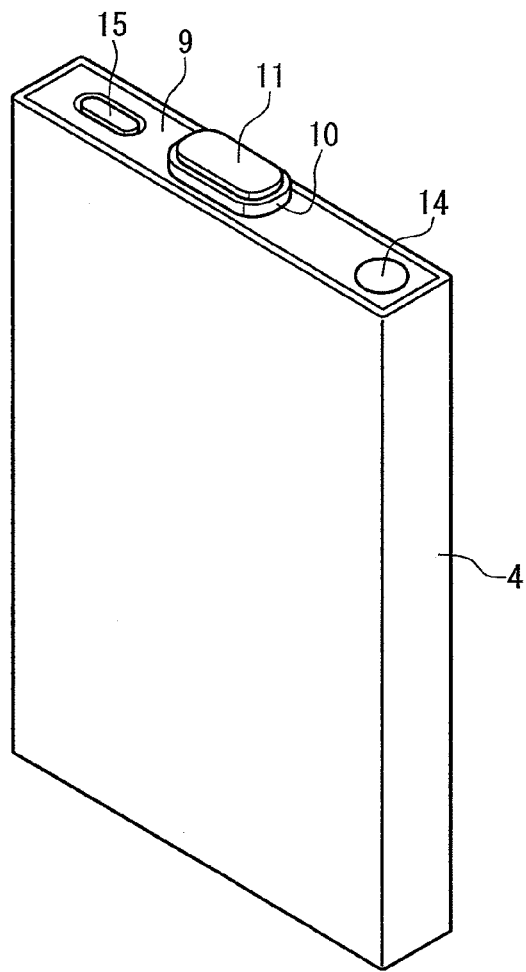
FIG. 2 is a perspective view showing the nonaqueous secondary battery shown in FIG. 1A.

The positive electrode and the negative electrode were wound via a porous polyethylene film separator [porosity: 53%, tensile strength in the MD direction: 2.1×10$^8$ N/m$^2$, tensile strength in the TD direction: 0.28×10$^8$ N/m$^2$, thickness: 16 μm, air permeability: 80 sec./100 mL, thermal shrinkage ratio in the TD direction after being stood still for eight hours at 105° C.: 3%, penetrating strength: 3.5 N (360 g)] in a spiral form to form a wound electrode body. In order to inserted the electrode body into a rectangular battery case, the electrode body was subsequently pressed to have a flat spiral structure. The electrode body was inserted in a rectangular battery case made of an aluminum alloy and the positive and negative electrode leads were welded and a cover plate was welded to an opening end of the battery case with a laser beam. The nonaqueous electrolytic solution was poured into the battery case through an inlet provided on the sealing cover plate. After saturating the separator, etc., with the nonaqueous electrolytic solution, partial charging was performed. Then, after letting out gas generated as a result of the partial charging, the inlet was closed to seal the battery case. Thereafter, charging and aging were performed, thus obtaining a rectangular nonaqueous secondary battery (width: 34.0 mm, thickness: 4.0 mm, height: 50.0 mm) having a structure as shown in FIGS. 1A and 1B and an appearance as shown in FIG. 2.

Hereinafter, the battery shown in FIGS. 1A, 1B and 2 will be described. A positive electrode 1 and a negative electrode 2 are wound via a separator 3 in a spiral form, and then pressed into a flat shape, thereby providing an electrode body 6 having a flat spiral structure. The electrode body 6, together with a nonaqueous electrolytic solution, is housed in a rectangular battery case 4. For the sake of simplicity FIGS. 1A and 1B do not illustrate metal foils as the current collectors of the positive electrode 1 and the negative electrode 2, the nonaqueous electrolytic solution, etc.

The battery case 4 is made of an aluminum alloy and serves a major part of the outer components of the battery, and this battery case 4 also functions as a positive electrode terminal. And, at the bottom of the battery case 4, an insulator 5 made of a polytetrafluoroethylene sheet is disposed. A positive electrode lead 7 and a negative electrode lead 8, which are connected to one end of the positive electrode 1 and that of the negative electrode 2, respectively, are led out from the electrode body 6 having a flat spiral structure and composed of the positive electrode 1, the negative electrode 2 and the separator 3. Further, a terminal 11 made of stainless steel is attached to an aluminum cover plate 9 for sealing an opening of the battery case 4 via an insulating packing 10 made of polypropylene. A lead plate 13 made of stainless steel is attached to the terminal 11 via an insulator 12.

And then, the cover plate 9 is inserted in the opening of the battery case 4, and by welding a joint portion between the cover plate 9 and the battery case 4, the opening of the battery case 4 is closed, and the inside of the battery is sealed. Further, in the battery shown in FIGS. 1A and 1B, the cover plate 9 is provided with an electrolytic solution inlet 14 and the electrolytic solution inlet 14 is sealed by, for example, laser beam welding in a state where a sealing member is inserted in the inlet to ensure the sealing of the battery. Although, in actuality, the electrolytic solution inlet 14 is composed of the electrolytic solution inlet and a sealing member, only the electrolyte inlet 14 is illustrated in the battery of FIGS. 1A, 1B and 2 for the sake of brevity. Furthermore, the cover plate 9 is provided with a flameproof vent 15.

In the battery of Example 1, the battery case 4 and the cover plate 9 function as positive electrode terminals as a result of the positive electrode lead 7 being welded directly to the cover plate 9, and the terminal 11 functions as a negative electrode terminal as a result of the negative electrode lead 8 being welded to a lead plate 13 and the negative electrode lead 8 and the terminal 11 being electrically conducted via the lead plate 13. However, depending on the material, etc., of the battery case 4, the positive and the negative may be reversed.

FIG. 2 is a perspective view schematically showing the appearance of the battery shown in FIGS. 1A and 1B. FIG. 2 is provided for the purpose of showing that the battery is a rectangular battery. In FIG. 2, the battery is shown schematically and, of the components of the battery, only specific components are shown.

Example 2

A nonaqueous secondary battery was produced in the same manner as in Example 1 except that 2,2-difluorosuccinonitrile (NC—$CF_2$—$CH_2$—CH) was added to the nonaqueous electrolytic solution in place of 2-fluorohexanedinitrile.

Example 3

A nonaqueous secondary battery was produced in the same manner as in Example 1 except that $C_6H_5$—CF(CN)$COOC_2H_5$ (α-cyano-α-fluoro-phenyl-ethyl acetate) was added to the nonaqueous electrolytic solution in place of 2-fluorohexanedinitrile.

Example 4

A nonaqueous secondary battery was produced in the same manner as in Example 1 except that $CH_3$—$C_6H_4$—CF(CN)$COOC_2H_5$ (α-cyano-α-fluoro-tolyl-ethyl acetate) was added to the nonaqueous electrolytic solution in place of 2-fluorohexanedinitrile.

Example 5

A nonaqueous secondary battery was produced in the same manner as in Example 1 except that $C_2H_5$—COO—CHF—P(=O)$(OC_2H_5)_2$ (triethyl-2-fluoro-2-phosphono-acetate) was added to the nonaqueous electrolytic solution in place of 2-fluorohexanedinitrile.

Example 6

A nonaqueous secondary battery was produced in the same manner as in Example 1 except that NC—CHF—P(=O)$(OC_2H_5)_2$ (diethyl-cyano-fluoro-methylphosphonate) was added to the nonaqueous electrolytic solution in place of 2-fluorohexanedinitrile.

Example 7

A nonaqueous secondary battery was produced in the same manner as in Example 1 except that the amount of 2-fluorohexanedinitrile added to the nonaqueous electrolytic solution was changed to 0.5 mass %.

Example 8

A nonaqueous secondary battery was produced in the same manner as in Example 1 except that the amount of 2-fluorohexanedinitrile added to the nonaqueous electrolytic solution was changed to 1.0 mass %.

Example 9

A nonaqueous secondary battery was produced in the same manner as in Example 1 except that the amount of 2-fluorohexanedinitrile added to the nonaqueous electrolytic solution was changed to 2 mass %.

Comparative Example 1

A nonaqueous secondary battery was produced in the same manner as in Example 1 except that $LiCoO_2$ (average particle size: 12 μm) was used in place of $LiCo_{0.998}Mg_{0.0008}Ti_{0.0004}Al_{0.0008}O_2$ (average particle size: 12 μm) in producing the positive electrode.

Comparative Example 2

A nonaqueous secondary battery was produced in the same manner as in Example 1 except that 2-fluorohexanedinitrile was not added to the nonaqueous electrolytic solution.

Comparative Example 3

A nonaqueous secondary battery was produced in the same manner as in Example 1 except that NC—$(CH_2)_4$—CN (1,6-hexanedinitrile) was added to the nonaqueous electrolytic solution in place of 2-fluorohexanedinitrile.

The characteristics of the nonaqueous secondary batteries of Examples 1 to 9 and Comparative Examples 1 to 3 were evaluated as follows.

<Discharge Capacity>

A charge/discharge test was conducted on each of the batteries of Examples 1 to 9 and Comparative Examples 1 to 3 as follows. After each battery was discharged until the battery voltage was reduced to 3.3 V at 1 C at ambient temperature, constant current charging was performed at 1 C until the battery voltage reached 4.4 V and subsequently constant voltage charging was performed at 4.4 V (a total of time over which each battery was charged (constant current charging and constant voltage charging): 2.5 hours). Then, each battery was discharged at 0.2 C until the battery voltage was reduced to 3.3 V These steps constituted one cycle and each battery was subjected to five cycles of charging and discharging. Table 1 provides the discharge capacity of each battery at the fifth cycle expressed in a relative value when the discharge capacity of the battery of Comparative Example 1 is assumed to be 100.

<Storage Characteristic Evaluation (Measuring Change in Thickness of Battery)

Constant current charging was performed on each of the batteries of Examples 1 to 9 and Comparative Examples 1 to 3 at 1 C until the battery voltage reached 4.4 V, and subsequently constant voltage charging was performed on each battery at 4.4 V (a total of time over which each battery was charged (constant current charging and constant voltage charging): 2.5 hours). After the charging, the thickness of each battery was measured (thickness before storage). Then, each battery was stored in a thermostat at 85° C. for 24 hours. Each battery was taken out from the thermostat and set aside at ambient temperature for four hours. Subsequently, the thickness of each battery was measured again (thickness after storage). Along with the discharge capacity of each battery, Table 1 also provides an increase in the thickness of each battery before and after the storage (thickness after storage-thickness before storage) expressed in a relative value when an increase in the thickness of the battery of Comparative Example 1 before and after the storage is assumed to be 100.

TABLE 1

|  | Discharge Capacity | Increase in thickness of Battery at storage characteristic evaluation |
|---|---|---|
| Ex. 1 | 115 | 87 |
| Ex. 2 | 115 | 97 |
| Ex. 3 | 115 | 55 |
| Ex. 4 | 114 | 77 |
| Ex. 5 | 114 | 93 |
| Ex. 6 | 114 | 91 |
| Ex. 7 | 114 | 78 |
| Ex. 8 | 114 | 22 |
| Ex. 9 | 108 | 20 |
| Comp. Ex. 1 | 100 | 100 |
| Comp. Ex. 2 | 114 | 110 |
| Comp. Ex. 3 | 114 | 108 |

As is evident from the results provided in Table 1, in comparison with the nonaqueous secondary batteries of Comparative Examples 2 to 3, the nonaqueous secondary batteries of Examples 1 to 9 to which the fluorinated nitrile compound was added swelled less during the storage and had a storage characteristic superior to the batteries of Comparative Examples 2 to 3.

Further, with regard to the battery of Comparative Example 1 in which additional elements were not contained in the positive electrode, no remarkable effect was found as compared with the batteries of Examples 1 to 9, even though swelling during the storage was reduced due to the fluorinated nitrile compound. This shows that even if the batteries are stored in a high voltage state, swelling during the storage is reduced noticeably by using the fluorinated nitrile compound in combination with the positive electrode active material containing additional elements.

Furthermore, the discharge capacity of the battery of Comparative Example 1 became smaller than those of the batteries of Examples 1 to 9 and Comparative Examples 2 to 3. Conceivably, this was caused by the disintegration of the crystal structure of $LiCoO_2$ in the positive electrode of the battery of Comparative Example 1 because each battery was charged/discharged at a high voltage of 4.4 V to 3.3 V.

Examples 10 to 18 and Comparative Example 4

The batteries of Examples 1 to 9 and Comparative Example 2 were placed in the battery storage space of commercially-available mobile phones as one type of portable devices, and a cover with a thickness of 0.8 mm was attached to each battery storage space. A clearance between the cover and each battery was about 0.3 mm. The mobile phones were stored in a thermostat at 85° C. for 24 hours, and then they were taken out and set aside at ambient temperature for four hours. In the mobile phone of Comparative Example 4 using the battery of Comparative Example 2, the cover was uplifted and was deformed. In contrast, even after the storage, no external change was found on the mobile phones of Examples 10 to 18 using the batteries of Examples 1 to 9, respectively.

The invention may be embodied in other forms without departing from the spirit of essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

INDUSTRIAL APPLICABILITY

According to the present invention, a nonaqueous secondary battery with a high capacity and an excellent storage characteristic can be provided and the battery can be used as a power source of a variety of electronic devices. Thus, it is possible to make the electronic device multifunctional or to reduce its size easily.

| Description of reference numerals | |
|---|---|
| 1 | positive electrode |
| 2 | negative electrode |
| 3 | separator |
| 4 | battery case |

The invention claimed is:

1. A nonaqueous secondary battery comprising a positive electrode including a positive electrode mixture layer, a negative electrode and a nonaqueous electrolyte, wherein the positive electrode mixture layer contains a lithium-containing complex oxide defined by the general formula (1) and has a density of 3.5 g/cm³ or more, and the nonaqueous electrolyte contains a solvent, an electrolyte salt, and a fluorinated nitrile compound including two or more cyano groups in molecules or a cyano group and an ester group in molecules, or triethyl-2-fluoro-2-phosphono-acetate;

$$Li_xM^1{}_yM^2{}_zM^3{}_vO_2 \qquad (1)$$

where, $M^1$ represents at least one transition metal element selected from the group consisting of Co, Ni and Mn, $M^2$ represents at least one metal element selected from the group consisting of Mg, Ti, Zr, Ge, Nb, Al and Sn, $M^3$ represents an element other than Li, $M^1$ and $M^2$, $0.97 \leq x < 1.02$, $0.8 \leq y < 1.02$, $0.002 \leq z \leq 0.05$, and $0 \leq v \leq 0.05$, and an amount of the fluorinated nitrile compound added to the nonaqueous electrolyte is 0.005 to 1.0 mass %.

2. The nonaqueous secondary battery according to claim 1, wherein the fluorinated nitrile compound has a chain structure.

3. The nonaqueous secondary battery according to claim 1, wherein the fluorinated nitrile compound includes a hydrocarbon chain in which fluorine substitutes at least a part of hydrogen, and the hydrocarbon chain except a cyano group and an ester group has a carbon number of 1 to 10.

4. The nonaqueous secondary battery according to claim 1, wherein the fluorinated nitrile compound or the triethyl-2-fluoro-2-phosphono-acetate is dissolved in the solvent.

5. An electronic device comprising a nonaqueous secondary battery,
wherein the nonaqueous secondary battery includes a positive electrode including a positive electrode mixture layer, a negative electrode and a nonaqueous electrolyte,
the positive electrode mixture layer contains a lithium-containing complex oxide defined by the general formula (1) and has a density of 3.5 g/cm³ or more, and
the nonaqueous electrolyte contains a solvent, an electrolyte salt, and a fluorinated nitrile compound including two or more cyano groups in molecules or a cyano group and an ester group in molecules, or triethyl-2-fluoro-2-phosphono-acetate;

where, $M^1$ represents at least one transition metal element selected from the group consisting of Co, Ni and Mn, $M^2$ represents at least one metal element selected from the group consisting of Mg, Ti, Zr, Ge, Nb, Al and Sn, $M^3$ represents an element other than Li, $M^1$ and $M^2$, $0.97 \leq x < 1.02$, $0.8 \leq y < 1.02$, $0.002 \leq z \leq 0.05$, and $0 \leq v \leq 0.05$, and an amount of the fluorinated nitrile compound added to the nonaqueous electrolyte is 0.005 to 1.0 mass %.

6. The electronic device according to claim 5, wherein the fluorinated nitrile compound has a chain structure.

7. The electronic device according to claim 5, wherein the fluorinated nitrile compound includes a hydrocarbon chain in which fluorine substitutes at least a part of hydrogen, and the hydrocarbon chain except a cyano group and an ester group has a carbon number of 1 to 10.

8. The electronic device according to claim 5, wherein the fluorinated nitrile compound or the triethyl-2-fluoro-2-phosphono-acetate is dissolved in the solvent.

* * * * *